Sept. 20, 1960

L. F. SKUBIC 2,953,340

PALLET TIERING HARDWARE

Filed Oct. 21, 1958

INVENTOR.
Leroy F. Skubic
BY Carlson, Pitzner,
Hubbard & Wolfe
Attys.

Sept. 20, 1960 L. F. SKUBIC 2,953,340
PALLET TIERING HARDWARE
Filed Oct. 21, 1958 3 Sheets-Sheet 2
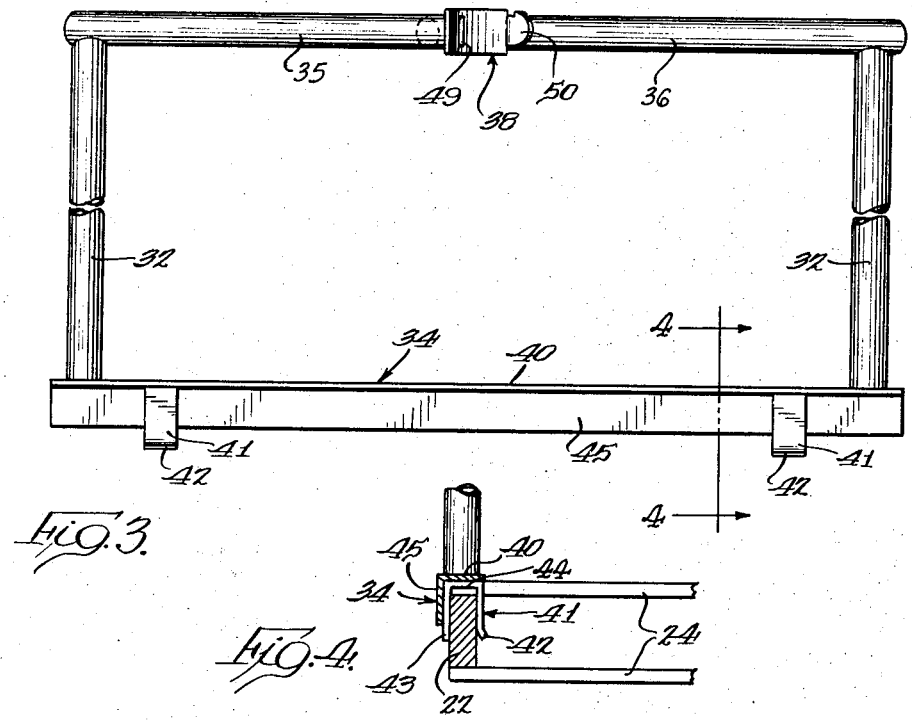
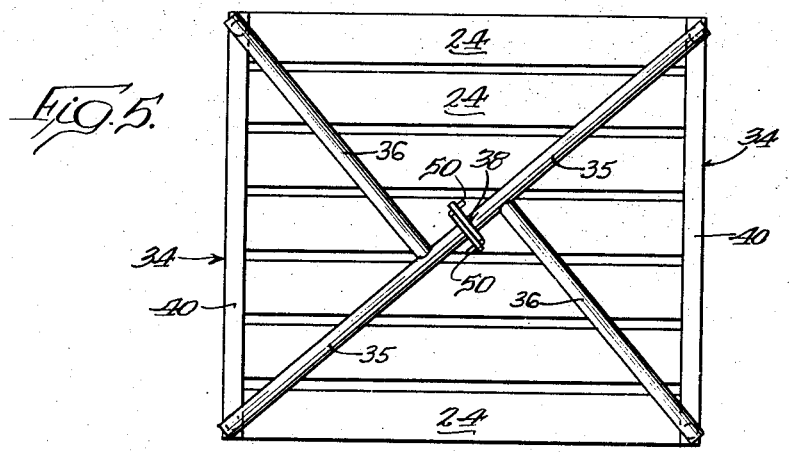
INVENTOR.
Leroy F. Skubic
BY
Carlson, Pitzner, Hubbard & Wolfe
Attys.

Sept. 20, 1960 L. F. SKUBIC 2,953,340
PALLET TIERING HARDWARE
Filed Oct. 21, 1958 3 Sheets-Sheet 3
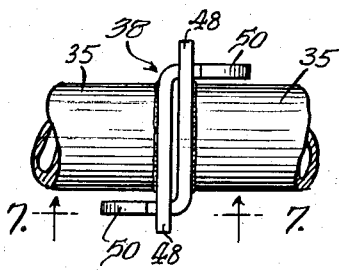
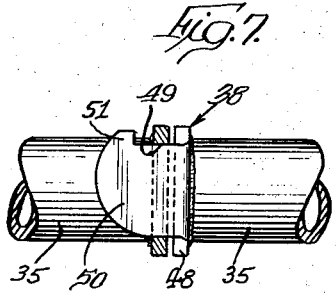
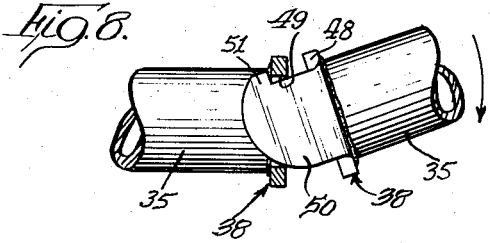
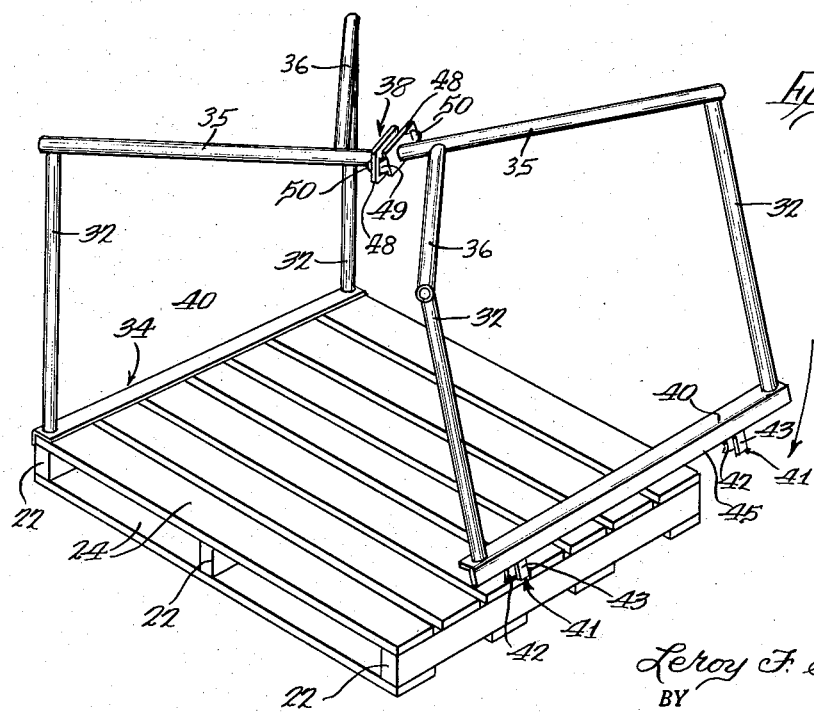
INVENTOR.
Leroy F. Skubic
BY
Carlson, Pitzner, Hubbard & Wolfe
Attys.

United States Patent Office 2,953,340
Patented Sept. 20, 1960

2,953,340
PALLET TIERING HARDWARE

Leroy F. Skubic, Beverly Shores, Ind., assignor to The Paltier Corporation, Michigan City, Ind., a corporation of Illinois Filed Oct. 21, 1958, Ser. No. 768,582
3 Claims. (Cl. 248—120)

The present invention relates to pallets for handling and storing articles. More particularly, the invention relates to an improved pallet tiering structure embodying two identical half-sections which, when joined together as a unitary frame and mounted on a pallet, are capable of supporting loaded pallets in vertical tiers.

Pallets of the type to which this invention relates, are commonly used in warehouse storage areas for stacking loads of merchandise and other articles on successive levels. In many instances, the pallets are shipped with the articles stacked on them from the factory to the customer. At various points enroute and even at their final destination the loaded pallets are oftentimes handled and stored in temporary locations. As is often the case permanent racks are not available or undesirable for stacking the loaded pallets. Without racks, however, the loaded pallets occupy a large floor area, causing undesirable congestion in the depot or warehouse.

It is the aim of the present invention to provide an improved pallet tiering structure of the above type which is easily mounted on and detachable from a standard commercial pallet without requiring the use of any tool or special pallet structure, and which, when assembled on the pallet, is structurally strong, rigid and proof against collapse or separation of its component sections under heavy asymmetric or transverse loads.

It is a particular object of the present invention to join the half-sections together at their upper ends in a manner which positively locks the sections together against separation when the structure is mounted on a pallet and even if a transverse separating force is applied between the sections. More specifically, it is an object to provide an improved joint structure including identical members on each half-section capable of positive interlocking engagement with each other to resist and preclude separation of the half-sections when the rack is mounted on a pallet. A further object of the present invention is to provide improved pallet supporting hardware of the foregoing character which is capable of providing adequate tiering support for a loaded pallet as well as secure confining support for material loaded on the pallet to which the hardware is attached, yet which is easily and simply constructed from common materials and is thus economical to produce and use and which requires no particular skill in assembling and attaching to a pallet.

Other objects and advantages of the present invention will become apparent to those skilled in the art as the following description proceeds, taken in connection with the accompanying drawings wherein:

Fig. 3 is an elevation view of a half-section for use in forming the frame shown in Fig. 1.

Fig. 4 is a fragmentary section view taken substantially in the plane of line 4—4 of Fig. 3 and showing the engagement between the pallet stringer and the hardware.

Fig. 5 is a plan view of a pallet having two half-sections of the type shown in Fig. 3 assembled thereon to form a tiering frame.

Fig. 6 is an enlarged plan view of an interlocking half-section joint illustrative of the present invention.

Fig. 7 is an elevation view of the interlocking joint shown in Fig. 6.

Fig. 8 is an elevation view of the interlocking joint shown in Fig. 6 illustrating an intermediate step in assembling the joint.

Fig. 9 is a perspective view of a pallet having a half-section of the type shown in Fig. 3 mounted thereon and illustrating the assembling therewith of a second half-section to form a completed frame.

Figure 1:
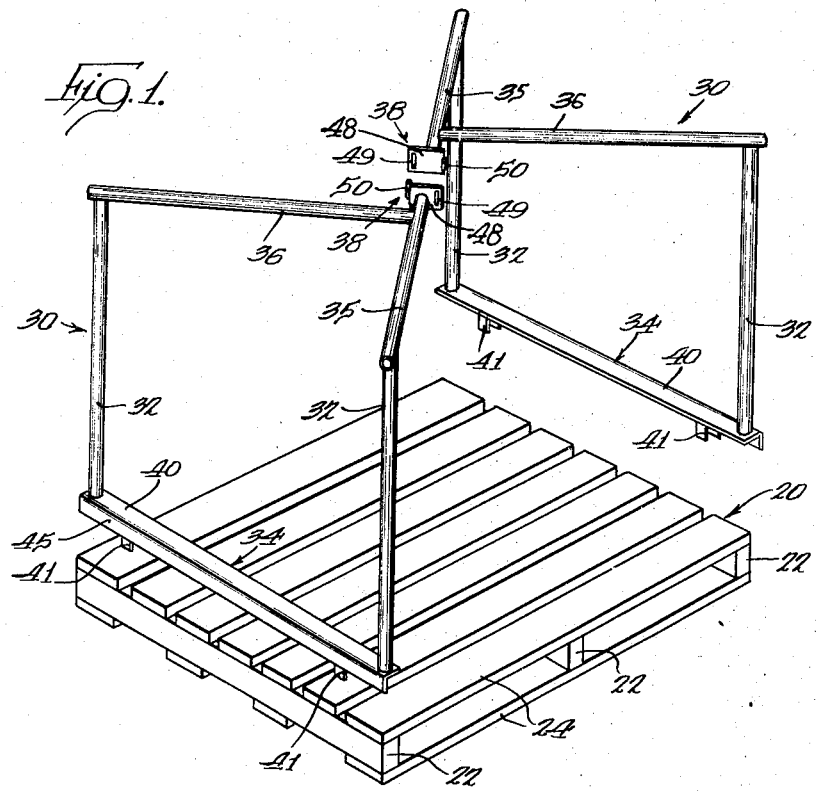
Figure 1 is an exploded perspective view of a pallet and pallet tiering hardware mountable thereon and embodying the present invention.

While the invention is susceptible of various modifications and alternative constructions, certain preferred embodiments have been shown in the drawings and will be described below in detail. It should be understood however, that there is no intention to limit the invention to the specific form disclosed but on the contrary the intention is to cover all modifications, alternative constructions, equivalents and uses falling within the spirit and scope of the invention, as expressed in the appended claims.

One form of pallet which is in general commercial use is shown in Fig. 1 of the drawings. Such a pallet, generally designated by the numeral 20, comprises three spaced parallel wooden stringers 22 having spaced top and bottom slats 24 disposed in crosswise relation and secured thereon by means of nails, screws, or the like. For convenience in describing the invention, the two slatted sides of the pallet are hereinafter referred to as the top and bottom respectively. The extremities of the pallet from which the stringers 22 extend are referred to as the pallet ends, and the extremities between which the slats 24 extend are referred to as the sides.

For use in stacking loaded pallets one above the other, there is provided a tiering frame which can be readily attached to the pallet without the use of special attaching hardware or fixtures.

Referring to the drawings, the pallet support frame there shown comprises a pair of identical half-frame sections 30, mounted at their lower ends on a conventional pallet 20 as a base and attachable at their upper ends to provide a strong, rigid support on which other pallets can be tiered. Each half-section of the frame 30 comprises a pair of vertical posts 32 provided with a slip-on base 34 on their lower ends for engaging a pallet, and having their upper ends secured to horizontal crossbars 35, 36 extending towards the center of the pallet. One of the crossbars 35 of each section is provided with a joint member 38 engageable with a similar member on the opposite half-section so that a rigid upper deck is provided for supporting another pallet.

The slip-on base 34 for engaging the pallet and supporting the half-frames therein can be of any suitable construction, such as the base described in my copending application, Serial No. 584,604 filed May 14, 1956, now U.S. Patent No. 2,924,339. Briefly, this type of base 34 comprises a flat plate 40, such as one leg of an angle iron, which rests on the deck surface of the pallet defined by the slats when the frame is mounted in place. This plate extends between and is securely fixed to the lower ends of the posts 32 by welding or by the provision of upwardly opening sockets into which the posts may be inserted. For engaging the pallet, spaced hairpin-like clips 41 are fixed to the underside of the plate 40. These clips extend downwardly from the base plate through the slots defined between the spaced slats and grip the adjacent stringer to hold the frame section securely on the pallet. For tightly gripping the stringer, the clips are formed with legs 42, 43 joined by a transverse web portion 44 and spaced apart a distance slightly less than the thickness of an average stringer so that they tightly grip the stringer when mounted in place. If desired, to facilitate insertion of the clips onto the stringer, the lower end of one of the legs 42 may be given a slight outward flare (Figs. 3 and 4).

When mounted on a base pallet, the frame provides an upper deck for supporting another pallet. This upper deck of the frame is defined by the pair of horizontal crossbars 35, 36 of each half-section. These bars, rigidly fixed to the upper ends of the vertical posts, extend inwardly over the pallet and converge above the center portion of the pallet. One of these crossbars 35 is mounted to extend substantially diagonally of the pallet and is provided at its inner end with the joint member 38. The other crossbar 36 extends inwardly towards the first crossbar 35 and is rigidly fixed to the latter at a point adjacent to but spaced from the inner end on which the joint member 38 is attached. In this manner the crossbars may define an included angle with each other which is 90° or is slightly greater or less than 90° depending upon the dimensions of the pallet (Fig. 5). Thus, when two similar half-sections are assembled to provide an upper deck with the interlocking joint members engaged, one crossbar of each section extends diagonally across the pallet so that, when the joint is engaged these bars make an angle of 180° with each other. The second crossbars 36 secured to the first, by welding for example, are parallel to each other and define with the first crossbars 35 a structurally rigid upper deck on which a pallet may be placed.

In accordance with one aspect of the present invention, there is provided at the inner end of each half-section an improved interlocking joint member for securing the two half-sections together. These joint members on the half-sections are mutually engageable in interlocking relation with each other to provide a positive lock between the sections when the frame is mounted on a pallet. To this end each joint member 38 comprises a vertical generally L-shaped plate 48 secured transversely across the free inner end of the first crossbar 35 of the half-section and formed with a vertical slot 49 in one end and a vertical arm defining a hook member 50 on the other end. The hook 50 is perpendicular to the plane of the plate 48 and extends generally parallel to the crossbar 35 to which the plate is attached. The arm defining the hook 50 is somewhat narrower than the plate 48 so that it will fit through the slot 49 in an opposed plate when the hooks are engaged.

The vertical hook member 50 on the plate 48 is engageable in the slot 49 in the corresponding plate 48 on the opposite half-section. When the hook is positioned in the slot, its upper and lower surfaces are closely adjacent to and may abut the corresponding upper and lower surfaces of the slot, and the plates are closely adjacent to, and, for additional support and rigidity, may even abut each other. A depending tongue 51 on each hook defines a shoulder for engaging the rear surface of the plate through which the hook is inserted thereby preventing direct horizontal withdrawal of the hooks and separation of the plate. To facilitate engagement of the hook in the slot, the upper edge of the hook is curved with a radius which is sufficiently small enough so that the hook portion can be readily inserted into the slot and yet be securely engaged therein. The joint thus provided is extremely rigid and strong and is resistant to horizontal forces tending to separate the half-sections when the frame is mounted on a pallet.

In order to engage the interlocking joint members 38 on opposed half-sections, the crossbars 35 to which the joint members 38 are attached are held at an upwardly opening obtuse angle relative to each other in a vertical plane. In this position, the plates 48 define with each other a downwardly opening V, that is they extend downwardly and apart (Fig. 8), and the hooks 50 can be engaged in the corresponding slots 49 on the opposite member by inserting the tongues 51 through the slots 49. The crossbars are then swung downwardly to close the V made by the plates and thereby engage the hooks on the slots. The curved portion of the hook slips readily into the slot so that the opposite members are easily engaged by a simple relative swinging movement. The joint thus formed is proof against separation by a direct pulling or even by a downward thrust.

With the slip-on base and interlocking joint structure described above, the half-sections are positioned on opposite sides of a base pallet with the section base 34 extending parallel to an underlying pallet stringer. To erect a frame on a pallet, one half-section is positioned in place by slipping the clips on the base between the deck slats and over the underlying stringer so that the base plate 40 is supported on the pallet deck over the stringer. A second section is then hooked in place in the manner shown in Fig. 9, by holding the second section at an angle with respect to the first section, so that the first crossbars 35 make an upwardly opening obtuse angle, and engaging the interlocking joint members 38 which overlie the center portion of the pallet. When the joint is engaged, the second section is swung downwardly, in the direction of the arrow in Fig. 9, and the clips 41 on the base 34 are directed between the pallet deck slats and forced over the underlying stringer. At the same time, the hooks 50 on the joint members are securely engaged in the corresponding slots 49.

Figure 2:
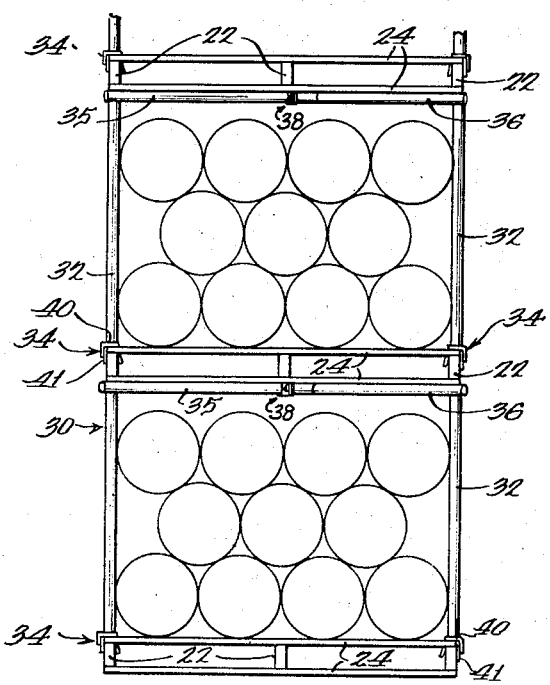
Fig. 2 is a perspective view of the pallet hardware shown in Fig. 1 mounted on the pallet and having superimposed pallets stacked thereon.

With the half-sections engaged together at their upper ends and securely supported on the pallet deck with the clips 41 gripping the stringers, the cross members 35, 36 define an upper deck supported above the pallet by the four vertical corner posts. The upper deck thus formed is suitable for supporting a tiered pallet, as shown in Fig. 2. Additionally, the corner posts, being securely mounted on the pallet and effectively secured together at their upper ends, can serve to confine material placed on the base pallet. The structure, by virtue of the interlocking joint 38, is proof against separation under horizontal forces acting on its corner posts such as might be caused by rolls of paper, cloth, roofing material and the like.

To disassemble the frame and thereby remove it from the pallet, the reverse procedure is employed. That is, the base of the second section is lifted off of the pallet to release the slip-on base clips from the pallet stringers. This frame structure is then swung unwardly and pulled away from the first half-section to disengage the hooks of interlocking joints. The first frame half-section is then removed from the pallet.

As an alternative form of the interlocking joint members, the hooks may be directed downwardly instead of upwardly. To mount a frame having this type of interlocking joint the half-sections are secured together before either one is mounted on a pallet. The complete frame thus defined is then mounted on a pallet by spreading the bases of the two sections and forcing the clips on the bases over the underlying stringers of the base pallet. To remove the frame from the pallet and disassemble it, the entire frame is removed and inverted. The half-sections can then be easily separated at the interlocking joint.

In still another modification, the posts may be so oriented so as to be positionable at the midpoints of the pallet sides and ends. With this arrangement, appropriate slip-on bases are provided on the lower end of each post. These bases will include depending hairpin-like clips positioned for gripping engagement with the corresponding pallet stringer in the manner described above. The interlocking joint and upper deck construction employed will be of the character described above.

I claim as my invention:

1. For use with a pallet tiering device including a pair of identical half-frames mountable on opposite sides of a base pallet for providing a tiering support deck for a second pallet thereon, an identical interlocking joint member on the deck portion of each of said half-frames for releasably attaching said frames together, each said joint member comprising a generally L-shaped vertical plate having one leg fixed to the deck portion of a half-frame and the other leg extending therefrom with said legs being disposed substantially diagonally with respect to the frame deck, said other leg being narrower than the one leg fixed to the frame and formed at its outer end with a rounded hook portion terminating in a hook shoulder, said one leg having a vertical slot therein into which the etxending leg and hook of an opposed plate is engaged when said half-frames are mounted on a pallet, said hook shoulder engaging the rear portion of the opposed plate for preventing direct horizontal separation of the half-frames.

2. For use with a pallet tiering device including a pair of identical half-frames mountable on opposite sides of a base pallet for providing a support deck for a second pallet thereon, an identical interlocking joint member on the deck portion of each of said half-frames for releasably attaching said frames together, each said interlocking joint device comprising an elongated vertical plate fixed on the frame deck and extending substantially diagonally with respect thereto, said plate having adjacent one end a vertical slot and adjacent the other end a transversely extending vertical hook, said hook on each half-frame joint device extending through a corresponding slot in the plate on the opposed half-frame and cooperating with said opposed plate to form a rigid positive joint between said half-frames thereby preventing direct horizontal separation of said half-frames.

3. For use with a pallet tiering device including a pair of identical half-frames mountable on opposite sides of a base pallet for providing a tiering support deck for a second pallet thereon, an identical interlocking joint member on the deck portion of each of said half-frames for releasably attaching said frames together, each said joint member comprising an elongated vertically disposed rectangular plate affixed to the frame deck portion of a half-frame in a position substantially diagonal with respect thereto, a vertical arm extending transversely from said plate and generally diagonally with respect to the frame deck, said arm having a width less than the width of said plate, the outer end of said arm being rounded and terminating in a hook shoulder, a vertical slot in said plate dimensioned to receive an arm on an opposed joint member, said opposed half-frames and joint members being swingable relative to each other for engaging said hooks and rounded ends in said slots so that said hook arms extend through the corresponding slots in the opposed joint member and the hooks engage said plates to form a rigid positive joint between said half-frames preventing direct horizontal separation thereof.

References Cited in the file of this patent

UNITED STATES PATENTS

| | | |
|---|---|---|
| 1,019,655 | Kalla | Mar. 5, 1912 |
| 1,366,743 | O'Connor | Jan. 25, 1921 |
| 2,828,932 | De Pew | Apr. 1, 1958 |
| 2,828,933 | De Pew | Apr. 1, 1958 |
| 2,871,861 | Posner | Feb. 3, 1959 |